(12) United States Patent
Chang

(10) Patent No.: US 11,878,520 B2
(45) Date of Patent: Jan. 23, 2024

(54) DROPLET MEASUREMENT USING STROBED LED SOURCE

(71) Applicant: Kateeva, Inc., Newark, CA (US)

(72) Inventor: Jerry Chang, Cupertino, CA (US)

(73) Assignee: Kateeva, Inc., Newark, CA (US)

( * ) Notice: Subject to any disclaimer, the term of this patent is extended or adjusted under 35 U.S.C. 154(b) by 238 days.

(21) Appl. No.: 17/302,618

(22) Filed: May 7, 2021

(65) Prior Publication Data

US 2021/0354446 A1 Nov. 18, 2021

Related U.S. Application Data

(60) Provisional application No. 63/024,168, filed on May 13, 2020.

(51) Int. Cl.
*B41J 2/045* (2006.01)
*G01N 15/02* (2006.01)
*G01N 15/14* (2006.01)

(52) U.S. Cl.
CPC ........ *B41J 2/0456* (2013.01); *G01N 15/0227* (2013.01); *G01N 15/1463* (2013.01); *B41J 2202/21* (2013.01); *G01N 2015/0294* (2013.01); *G01N 2015/1493* (2013.01); *G01N 2015/1497* (2013.01)

(58) Field of Classification Search
CPC . B41J 2/0456; B41J 2202/21; G01N 15/0227; G01N 15/1463; G01N 2015/0294; G01N 2015/1493; G01N 2015/1497
See application file for complete search history.

(56) References Cited

U.S. PATENT DOCUMENTS

| | | | |
|---|---|---|---|
| 2002/0140757 A1* | 10/2002 | Tullis | B41J 29/393 |
| | | | 347/19 |
| 2005/0225788 A1* | 10/2005 | Katayama | H04N 1/00092 |
| | | | 358/1.12 |
| 2015/0273912 A1 | 10/2015 | Derleth et al. | |
| 2017/0259560 A1* | 9/2017 | Sreenivasan | B41J 2/04581 |

FOREIGN PATENT DOCUMENTS

JP 2006167534 A * 6/2006 ............... B05D 3/00

OTHER PUBLICATIONS

International Search Report and Written Opinion dated Aug. 2, 2021 for International Application No. PCT/US2021/070519.

* cited by examiner

*Primary Examiner* — Yaovi M Ameh
(74) *Attorney, Agent, or Firm* — Hauptman Ham, LLP

(57) ABSTRACT

Methods and apparatus are described herein for measurement of droplets dispensed from a printhead of an inkjet printer onto a substrate. An inkjet printer described herein comprises a printhead assembly comprising a printhead and an imaging system, the imaging system comprising a camera and a strobed LED source; and a deposition unit for positioning a substrate to receive droplets dispensed from the printhead and for imaging the droplets using the imaging system and the strobed LED source. Methods described herein comprise dispensing droplets of a liquid from a printhead of a printhead assembly of an inkjet printer onto a substrate; positioning the substrate with respect to an imaging system coupled to the printhead assembly, the imaging system comprising a camera and an LED light source; and imaging the droplets on the substrate by relatively scanning the substrate and the imaging system and strobing the LED light source.

16 Claims, 3 Drawing Sheets

DROPLET MEASUREMENT USING STROBED LED SOURCE

CROSS-REFERENCE TO RELATED APPLICATIONS

This application claims benefit of U.S. Provisional Patent Application Ser. No. 63/024,168 filed May 13, 2020, which is incorporated herein by reference.

FIELD

Embodiments described herein generally relate to inkjet printers for industrial applications. Specifically, methods and apparatus for droplet measurement using strobed LED light sources are described.

BACKGROUND

Large inkjet printers are often used to print patterns on large substrates with extreme precision. An example is the production of display screens. The various functional materials that produce an operative display screen can be deposited on a glass substrate, or another kind of substrate, by inkjet printing microscopic droplets on the substrate and then solidifying the droplets into a functional material. The droplets can be as small as 10 µm in diameter, and may be deposited in a way that forms a continuous film with very precise dimensions. Thus, the spacing of the droplet deposition must be extremely precise, with positional error of no more than about 10 µm in some cases. The print material is ejected from a printing assembly that has one or more nozzles capable of creating the microscopic droplets, and the precision requirements of such applications mean that the nozzles must dispense droplets very precisely and predictably.

In conventional printers, the print heads are tested by printing a test pattern on a substrate. The test pattern is evaluated by photographing the printed test pattern and then performing image processing to evaluate the accuracy of the printed pattern. This process of capturing images is typically as sensitive as placement of the droplets themselves. A typical test involves depositing multiple droplets from different nozzles, and the capturing images of the droplets. The droplets are so small that clear, high-resolution images are needed. The cameras used for such images necessarily have small view fields, so multiple images must be captured in many cases, and the camera or the substrate must be moved between images. When the equipment moves, it takes time for vibration of the equipment to subside to an amplitude that can be tolerated in the exacting imaging process. There is a need for a more efficient droplet measurement.

SUMMARY

Embodiments described herein provide an inkjet printer, comprising a printhead assembly comprising a printhead and an imaging system, the imaging system comprising a camera and a strobed LED source; and a deposition unit for positioning a substrate to receive droplets dispensed from the printhead and for imaging the droplets using the imaging system and the strobed LED source.

Other embodiments described herein provide a method, comprising dispensing droplets of a liquid from a printhead of a printhead assembly of an inkjet printer onto a substrate; positioning the substrate with respect to an imaging system coupled to the printhead assembly, the imaging system comprising a camera and an LED light source; and imaging the droplets on the substrate by relatively scanning the substrate and the imaging system and strobing the LED light source.

Other embodiments described herein provide an inkjet printer, comprising a printhead assembly comprising a printhead and an imaging system, the imaging system comprising a camera and a strobed LED at a location that is off-axis relative to an axis of the imaging system; a deposition unit for positioning a substrate to receive droplets dispensed from the printhead and for imaging the droplets using the imaging system and the strobed LED source; and a controller configured to strobe the LED source to ensure any distortion of images captured by the camera due to relative movement of the camera and substrate is much less than a typical dimension of the droplets being imaged.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
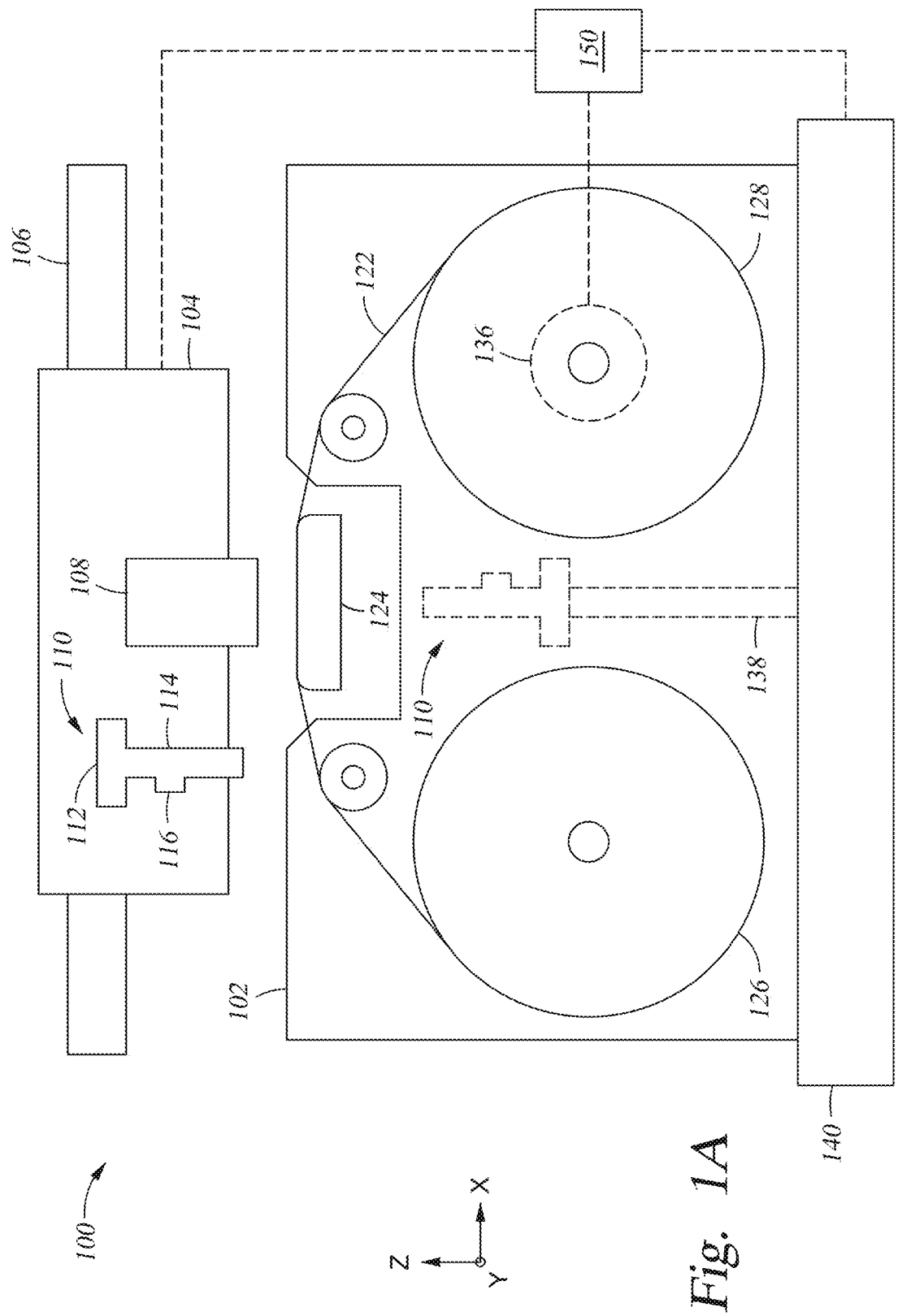
FIG. 1A is a cross-sectional view of a droplet measurement system according to one embodiment.

Described herein are droplet measuring systems for inkjet printers. FIG. 1A is an cross-sectional view of a droplet measurement system 100 according to one embodiment. The droplet measurement system 100 is typically part of an inkjet printer, which is not shown. The printer typically has a printhead assembly 104 that travels along a track 106, allowing the printhead assembly 104 to move to locations where printing on a substrate is desired, and to move to a location where droplet measurement can be performed.

The droplet measurement system 100 includes a deposition unit 102 that contains a substrate 122 used for droplet measurement. The printhead assembly 104 includes a printhead 108, which emits liquid droplets, and an imaging system 110. The track 106 enables the printhead assembly 104 to be positioned to print droplets from the printhead 108 onto the substrate 122 and to image the substrate 122 using the imaging system 110.

The substrate 122 is a flexible substrate that is unspooled from a source roll 126 and respooled onto a takeup roll 128. Between the source roll 126 and the takeup roll 128, the substrate 122 is routed to a test platform 124 for interaction with the printhead 108 and the imaging system 110 by a first routing roller 130 and from the test platform 124 to the takeup roll 128 by a second routing roller 132. The source and/or takeup rollers 126 and 128 are typically turned by a motor 136, so the substrate 122 is advanced after each deposition and imaging cycle to a clean portion of the substrate 122 for a new deposition and imaging cycle.

The deposition unit 102 is typically modular, with the substrate 122 and rollers 126, 128, 130, and 132 contained in a cartridge (not shown), and the motor 136 housed in a housing that accepts the cartridge and positions the cartridge to engage with the motor. In some cases, the imaging system 110 can be located in the housing, as shown by the "phantom" imaging system located, in this case, between the source roll 126 and the takeup roll 128. A support 138 may be provided for the imaging system 110, if the imaging system 110 is located in the housing. The support 138 may include a positioner (not shown) to position the imaging system 110 independently with respect to the substrate 122 in one, two, or three dimensions.

The imaging system 110 includes a camera 112, and optical system 114, and a light source 116. The optical system 114 typically includes optics to steer light from the light source 116 toward the substrate 122. Light reflects from the substrate 122, or from the surface of the test platform 124, and back to the optical system 114, ultimately to the camera 112.

The imaging system 110 includes a camera 112, and optical system 114, and a light source 116. The optical system 114 typically includes optics to steer light from the light source toward the substrate 124. Light reflects from the substrate 124, or from the surface of the test platform 124, and back to the optical system 114, ultimately to the camera 112.

During imaging, the imaging system 110 is scanned with respect to the portion of the substrate 122 with dots printed on it. The printhead assembly 104 is moved along the track 106 so that the imaging system 110 can obtain multiple exposures across the entire printed area of the substrate 122. As the printhead assembly 104 moves with respect to the substrate 122, position of the printhead assembly 104 is signaled to a controller 150 by one or more position sensors (not shown) coupled to the printhead assembly 104. The controller 150 uses the position signals to determine when the field of view of the camera 112 is occupied by a new area of the substrate 122. At that time, the controller 150 activates the light source 116 to illuminate the field of view of the camera 112. Scanning continues during the exposure, so the illumination is very brief to avoid movement of the camera distorting the very sensitive imaging. Duration of the illumination is typically less than about 2 μsec, for example about 1 μsec. The short duration is typically selected to ensure any distortion of the image from movement of the camera is much less than a typical dimension of the droplets being imaged. For example, if droplets being imaged have dimensions of 10-15 μm, camera movement during illumination of the field of view may be 1 μm or less.

In order to illuminate the camera field of view with sufficient light to obtain a clear image, the light source 116 is configured to produce a large optical output of uniform intensity in a very short time. For this purpose, a plurality of LED light sources are used. LEDs can produce very bright light, very quickly, without the interference effects that lasers can produce.

Figure 1B:
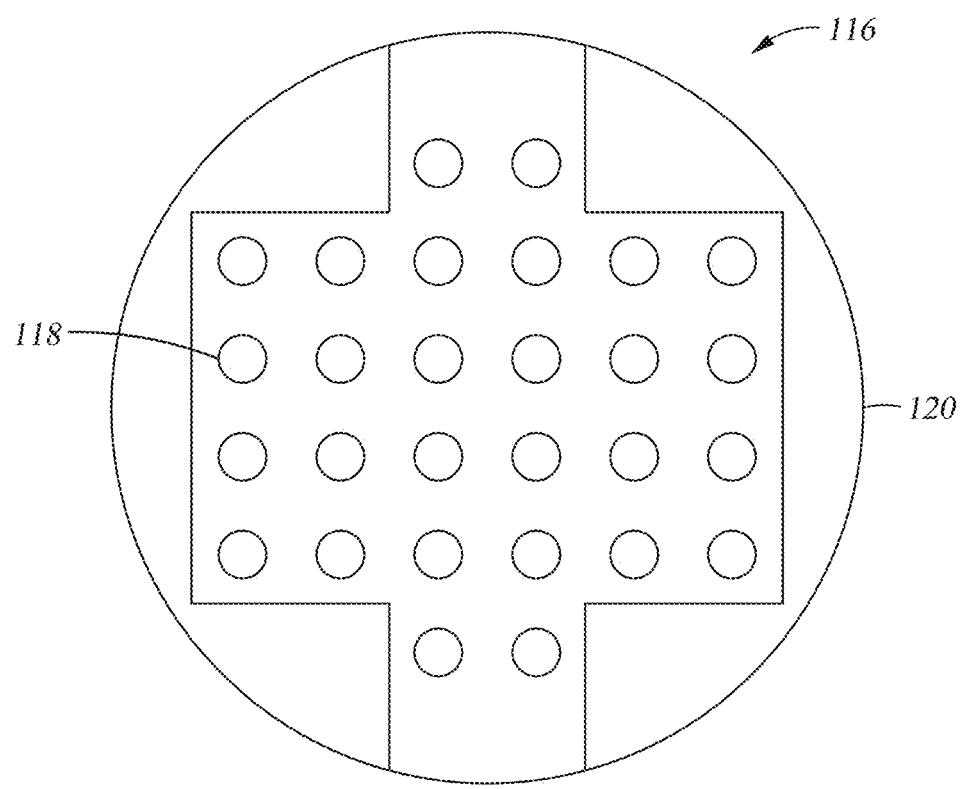
FIG. 1B is a plan view of a light source for the droplet measurement system of FIG. 1A.

FIG. 1B is a plan view of the light source 116 of FIG. 1A. The light source 116 has a circular aspect to be able to engage with the imaging system 110. The light source 116 has a housing 120 that holds a powering circuit (not shown) for a plurality of LEDs 118 disposed at a surface of the light source 116. Referring again to FIG. 1A, the light source 116 is located off-axis, so the optical system 114 includes optics, such as optical splitters, that direct the light from the light source 116 toward the substrate 122. As the printhead assembly 104 reaches a position where the field of the view of the camera 112 is occupied by a previously un-imaged area, the controller 150 uses position signals from the position sensors to determine an activation time for the light source 116, and signals a power supply (not shown) coupled to the light source 116 to activate. After a predetermined time, or a time calculated by the controller 150 based on signals from the position sensors and the known dimension of the field of view of the camera 112, the controller 150 signals the power supply to deactivate, de-energizing the light source 116. As the printhead assembly 104 scans with respect to the substrate 122, the light source 116 strobes on and off as images are sequentially obtained across the width of the printed area of the substrate 122. As the scanning progresses, the light source is deactivated for a time that is up to 100% of a duration required for the scan to progress by one increment of the field of view of the camera. The deactivation time may be less than 100%, for example 90%, 95%, or 99%, to provide some overlap of images so that a complete image of the deposited droplets can be obtained.

The deposition unit 102 may have a positioner 140 that positions the deposition unit 102 in at least the y-direction and the z-direction. Positioning in the z-direction provides controlled print gap between the substrate 122 and the printhead 108 as well as controlled imaging proximity to the optical system 114 of the imaging system 110 for focal control. Positioning in the y-direction allows raster scanning of the substrate 122 with respect to the imaging system 110 to be able to image the entire printed area in sequentially-obtained images.

As images are obtained during the scanning, the images are provided to the controller 150 for processing. As each image is received by the controller 150, image processing is performed to identify portions of the image corresponding to printed dots and to determine characteristics of the printed dots in the image. Thus, the controller 150 does not need to wait until all the images are obtained before image processing can commence, speeding up analysis of the array of printed dots. The controller 150 is configured to recognize and distinguish complete dots in an image from incomplete dots that may be at an edge of an image. Where an image contains incomplete dots, the controller 150 is configured to integrate an image with a subsequent image in a way that converts the incomplete dot to a complete dot for image processing. The controller 150 may be configured to perform such image integration in two dimensions, if required. If the images are overlapped by a predetermined amount, the controller 150 can integrate images based on the known overlap amount. The controller 150 may also be configured to detect image edges, for example by brightness gradients, to achieve fine alignment of neighboring images.

Figure 2:
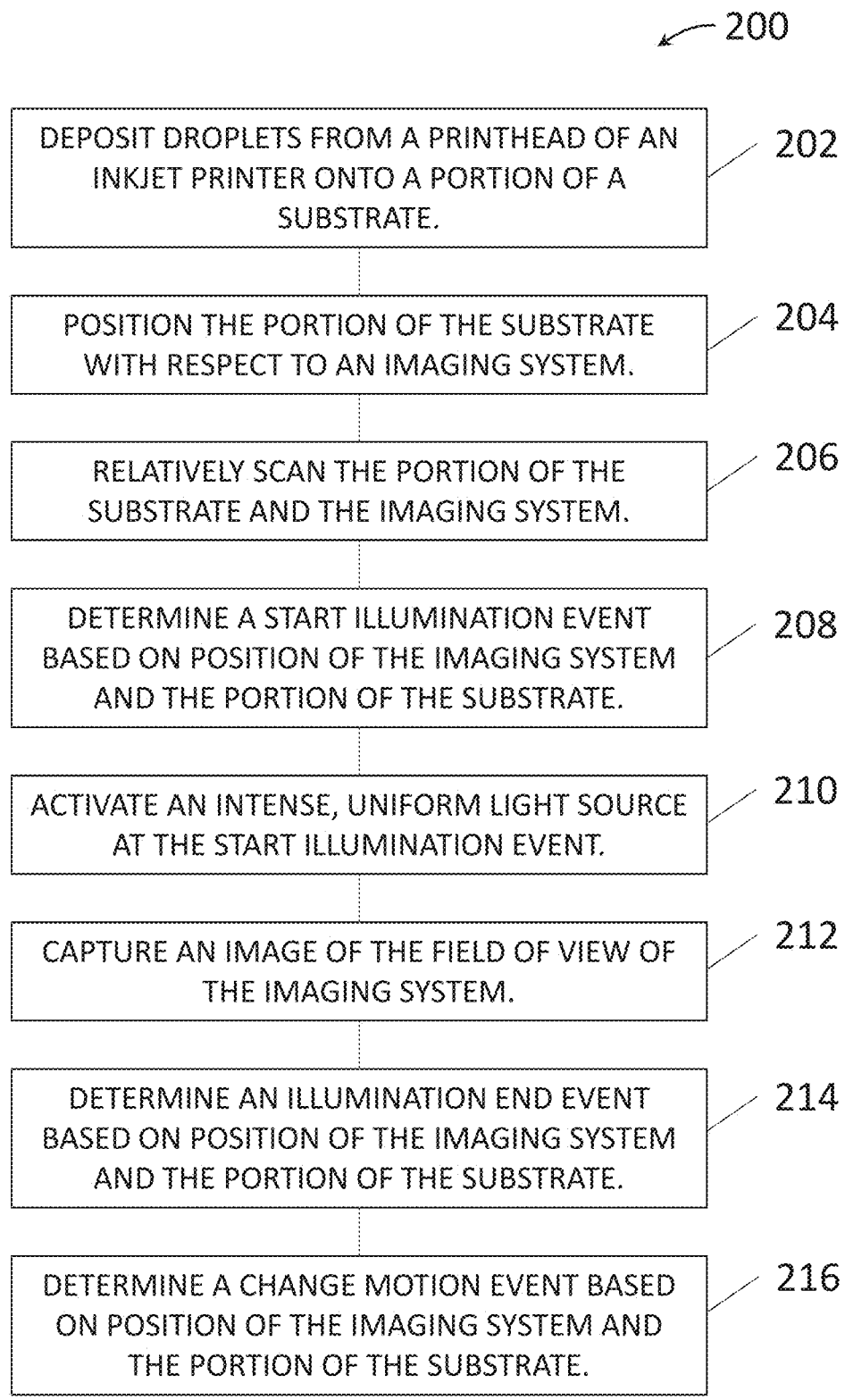
FIG. 2 is a flow diagram summarizing a method according to one embodiment.

FIG. 2 is a flow diagram summarizing a method 200 according to one embodiment. The method 200 is a method of capturing an image of droplets dispensed onto a substrate by a printhead of an inkjet printer. At 202, droplets are deposited on a first portion of the substrate according to a predetermined pattern. Where a printhead includes a plurality of nozzles for dispensing droplets, one or more droplets may be dispensed from each nozzle, or a portion of the nozzles may be omitted. The droplets are dispensed according to a predetermined amount and are associated with an expected shape and dimension as deposited on the portion of the substrate.

At 204, the portion of the substrate is positioned with respect to an imaging system to capture one or more images of the droplets deposited on the portion of the substrate. The portion of the substrate may be moved, or the imaging system may be moved, or both, to align the substrate and the imaging system to capture images of the droplets. The substrate and imaging system are aligned with respect to a field of view of the imaging system, whose dimensions and location are known. A start position of the substrate is aligned with a start position of the imaging system, based on the known position and dimension of the field of view of the imaging system, using positioners that measure and report position of the portion of the substrate, or a holder carrying the substrate, and the position of the imaging system, or the imaging system field of view. Typically, a controller is used to signal the positioners to move the imaging system and the portion of the substrate to specified locations or by specified offsets in one or more directions.

At 206, the portion of the substrate and the imaging system are relatively scanned. The imaging system may be moved, or the substrate may be moved, or both to accomplish the scanning. The scanning is performed in one direction to scan the imaging system across the portion of the substrate with deposited droplets so that each droplet enters the field of view of the imaging system.

At 208, a start illumination event is determined based on position of the imaging system and the portion of the substrate. The start illumination event is determined when a predetermined fraction of the field of view of the imaging system is occupied by a region of the portion of the substrate that has not been imaged. The method 200 is a repetitive method that captures multiple images of the portion of the substrate until the entire portion is imaged. At the time of capturing the first image in a scan, the first start illumination event may coincide with the start of scanning, or start of scanning may precede the first start illumination event by a predetermined duration to allow non-linear movement of the substrate and/or the imaging system from the start of scanning to subside.

A substrate imaging event may comprise multiple images, which may be numbered. Each image may be associated with an illumination start delay and with an overlap fraction. As scanning progresses, and the relative positions of the imaging system and the substrate change, positioners, for example encoders, track the positions of the imaging system and the substrate. A controller is typically used to determine a distance traveled since the last illumination event, which is defined by an illumination start and an illumination end. When the cumulative distance reaches the known dimension of the camera field of view, another illumination event is triggered. The start illumination event for an image number is determined as the time when the cumulative distance since the last illumination event reaches the known dimension of the camera field of view, decreased by the overlap fraction associated with the image number, and increased by an illumination delay associated with the image number. Illumination delay is typically used when the relative motion of the substrate and the imaging system must be changed. As noted above, an illumination delay, for example 1-5 µsec, may be used to allow non-linear motion of either the substrate or the imaging system to subside after a motion change event. The overlap fraction may be 0, or may be a positive fraction between 0 and 1, typically 0.1 or less, for example 0.1, or 0.05, or 0.01. Instead of an overlap fraction, a deactivation fraction may be specified for each image, representing the fraction of the total field of view translation that the illumination is deactivated. As noted above, the deactivation fraction may be 1.0, or a fraction between 0 and 1, for example 0.9 or 0.95 or 0.99. Where a deactivation fraction is associated with each image, the start illumination event is determined as the time when cumulative distance since the last illumination event reaches the known dimension of the camera field of view, multiplied by the deactivation fraction, and increased by the illumination delay.

At 210, a light source is activated when the start illumination event is triggered. The light source is an intense light source capable of providing illumination sufficient to capture an image in a very short time such as 1 µsec, a time typically less than 2 µsec, for example from 0.1 µsec to 2 µsec, while minimizing optical artifacts in the radiation field produced by the light source. A plurality of LED sources can be used for this purpose. LED light sources typically produce uniform light with correlation that is statistically indistinguishable from zero, resulting in minimal, or no, optical artifacts in the illumination field produced by the source. When activated, the light source illuminates the field of view of the imaging system with a bright, uniform illumination field.

At 212, an image is captured of the field of view of the imaging system. The field of view of the imaging system may be smaller than the portion of the substrate on which droplets were deposited for measuring. In such cases, the scanning described herein is used to image the entire deposition field in a number of sequentially obtained images by strobing the light source multiple times while relatively scanning the substrate and the imaging system.

Relative scanning of the substrate and the imaging system continues while the light source is activated. At 214, after a predetermined illumination time or illumination scan distance, an end illumination event is determined based on position of the imaging system and the portion of the substrate. The predetermined illumination time or illumination distance may be associated with the image, so that each image has an associated illumination time or distance. Alternately, a single illumination time or distance may be applied to all images captured during a scan of droplets deposited on a portion of the substrate.

At 216, a change motion event is determined based on position of the substrate with respect to the imaging system. Typically, droplets will be deposited on the substrate in a two-dimensional deposition field, and a plurality of partial scans are required to image all the droplets. In such cases, a first partial scan is performed in a first direction to image a first portion of the deposition field. The deposition field typically has a known dimension, and the controller tracks cumulative scan distance, as the substrate and the imaging system are relatively scanned from a start position of the partial scan to an end position of the partial scan, until the cumulative distance equals the known dimension (or until the cumulative scan distance, added to the known dimension of the imaging system field of view, equals the known dimension of the deposition field). When the cumulative scan distance reaches the above quantity, a change motion event is determined. The change motion event is executed by stopping the scanning motion in the first direction, and by moving the substrate and the imaging system relatively in a second direction orthogonal to the first direction a predetermined distance corresponding to a dimension of the imaging system field of view. An overlap may be applied to this movement as well. Scanning then commences in a direction opposite to the first direction, and the method 200 is repeated. Alternatively, the change motion event may further include moving the substrate and the imaging system relatively to position the substrate and the imaging system at a position corresponding to the start position of the previous partial scan so that scanning is always in the same direction.

As scanning continues, the method 200 is repeated starting at 208. The light source remains deactivated until a predetermined, or calculated, scan distance is achieved such that the field of view of the imaging system is substantially, or mostly, occupied by a portion of the deposition field that has not yet been imaged, as controlled by the various overlap, delay, and/or deactivation time factors described above. In this way the entire deposition field is imaged by relatively scanning the substrate and the imaging system and strobing the intense, uniform light source to capture sequential images until the entire deposition field is imaged.

As each image is captured by illuminating the field of view of the imaging system, data representing the image is sent to a processor for image processing. Because the images are captured according to a known positional relationship, one to another, the images can be integrated by the processor into one image data set representing the entire deposition field of the portion of the substrate. The image processing can proceed while images are captured to minimize processing time. The images can be integrated based on the overlap and/or deactivation fractions associated with neighboring images. In some cases, a first image alignment can be performed based on the overlap and/or deactivation fractions, and then a second alignment can be performed according to image edges detected, for example, by brightness gradients in the images.

After all images of the deposition field are captured, the substrate may be advanced to move the deposited portion of the substrate away from the imaging system and to move a clean portion of the substrate into position for deposition by the printhead and imaging by the imaging system. If the substrate is collected on a roll, the liquid droplets may be solidified before advancing the substrate, for example by curing or drying. In some cases, the liquid droplets contain a curable material, such as a polymerizable material, which may be cured by exposure to ultraviolet radiation. In other cases, the liquid droplets may contain a solvent, which may be removed by drying. In any event, hardening the liquid droplets before advancing the substrate prevents the deposited liquid material from fouling other equipment as the substrate is advanced.

In a variation of the method 200, the LED light source may be activated and inactivated at a frequency selected based on relative scan speed of the substrate and the imaging system and the size of features to be imaged on the substrate. Thus, start illumination events may be determined at a set time after illumination end events based on the set frequency. The frequency may be selected to capture images that spatially overlap according to a set amount. As mentioned above, illumination duration can be selected to ensure distortion of an image captured during the illumination duration due to relative scanning of the imaging system and the substrate is much smaller than a dimension of features being imaged.

The amount of overlap among successive images can be selected by choosing illumination frequency based on scan speed. In some cases, only two successive images overlap spatially. That is to say, in some cases one image only spatially overlaps with the immediately preceding image and with the immediately succeeding image. In other cases, an image may spatially overlap with two preceding images and with two succeeding images. The degree of overlap can be selected by choosing illumination frequency based on scan speed.

The images are processed to define dots in the images and characteristics, such as edge definition, of the dots. Where images overlap, images can be integrated by image processing software into an image data set representing an overall image of the substrate. While processing multiple overlapping images can increase data processing needs, such processing can improve signal-noise discrimination in the images by providing redundancy of imaging. Image integration can also be used to put together partial images of features on the substrate into complete images. Strobing the LED light source provides intense, short-duration illumination to enable imaging during continuous relative scanning of the imaging system and substrate with minimal distortion of the images.

While the foregoing is directed to embodiments of the present invention, other and further embodiments of the present disclosure may be devised without departing from the basic scope thereof, and the scope thereof is determined by the claims that follow.

I claim:

1. An inkjet printer, comprising:
   a printhead assembly comprising a printhead and an imaging system, the imaging system comprising a camera and a strobed LED source; and
   a deposition unit for positioning a substrate to receive droplets dispensed from the printhead and for imaging the droplets on the substrate using the imaging system and the strobed LED source, the inkjet printer further comprising a controller configured to determine, based on a position of the printhead assembly, an activation time for the strobed LED source, the activation time being a time when an un-imaged area of the substrate enters the field of view of the camera.

2. The inkjet printer of claim 1, wherein the controller is further configured to maintain activation of the strobed LED source for a duration that is selected to ensure any distortion from relative movement of the camera and substrate is much less than a typical dimension of the droplets being imaged.

3. An inkjet printer, comprising:
   a printhead assembly comprising a printhead and an imaging system, the imaging system comprising a camera and a strobed LED source; and
   a deposition unit for positioning a substrate to receive droplets dispensed from the printhead and for imaging the droplets on the substrate using the imaging system and the strobed LED source, the inkjet printer further comprising a controller configured to:
   during a scan process wherein the substrate and the printhead are relatively scanned,
      activate the strobed LED source, illuminating an area of the substrate for a duration selected to ensure any distortion from relative scanning of the camera and substrate is much less than a typical dimension of the droplets being imaged;
      deactivate the strobed LED source after the duration; and
      reactivate the strobed LED source after a time selected to ensure a previously un-imaged area of the substrate occupies at least a portion of the field of view of the camera.

4. The inkjet printer of claim 3, wherein the controller is configured to reactivate the strobed LED source after a time selected to ensure an image is captured that overlaps spatially with a previously-captured image.

5. The inkjet printer of claim 3, wherein the controller is further configured to perform image analysis on images captured by the camera to define dots in the images.

6. The inkjet printer of claim 5, wherein the controller is further configured to resolve characteristics of the dots as part of the image analysis.

7. The inkjet printer of claim 6, wherein the controller is further configured to integrate images of partial dots in one or two dimensions.

8. A method, comprising:
dispensing droplets of a liquid from a printhead of a printhead assembly of an inkjet printer onto a substrate;
positioning the substrate with respect to an imaging system coupled to the printhead assembly, the imaging system comprising a camera and an LED light source; and
imaging the droplets on the substrate by relatively scanning the substrate and the imaging system and strobing the LED light source, wherein strobing the LED light source comprises illuminating an area of the substrate for a duration selected to ensure any distortion from relative scanning of the camera and substrate is much less than a typical dimension of the droplets being imaged, and wherein strobing the LED light source further comprises activating the LED light source at a time when a previously un-imaged portion of the substrate is within a field of view of the camera.

9. The method of claim 8, wherein the LED light source is activated at a time to ensure an image of the substrate is captured that spatially overlaps with a previous image of the substrate captured by the camera.

10. The method of claim 8, further comprising processing images captured by the camera to define dots in the images.

11. The method of claim 10, further comprising processing the images to define characteristics of the dots in the images.

12. The method of claim 11, further comprising integrating images having partial dots.

13. The method of claim 12, wherein integrating the images is performed in two dimensions.

14. An inkjet printer, comprising:
a printhead assembly comprising a printhead and an imaging system, the imaging system comprising a camera and a strobed LED source at a location that is off-axis relative to an axis of the imaging system;
a deposition unit for positioning a substrate to receive droplets dispensed from the printhead and for imaging the droplets on the substrate using the imaging system and the strobed LED source; and
a controller configured to strobe the LED source to ensure any distortion of images captured by the camera due to relative movement of the camera and substrate is much less than a typical dimension of the droplets being imaged, wherein the controller is further configured to determine, based on a position of the printhead assembly, an activation time for the strobed LED source, the activation time being a time when an un-imaged area of the substrate enters the field of view of the camera.

15. The inkjet printer of claim 14, wherein the controller is further configured to determine the activation time such that an image captured by the camera spatially overlaps with a previous image captured by the camera.

16. The inkjet printer of claim 15, wherein the controller is further configured to process images captured by the camera to define dots in the image and to determine characteristics of the dots.

* * * * *